United States Patent Office 3,775,355
Patented Nov. 27, 1973

3,775,355
FLAME RESISTANT EPOXY-BASED MATERIALS AND A PROCESS FOR THEIR PREPARATION
Karl Jellinek, Letmathe, Udo Post, Wissmar Uber Giessen, Dieter Gerlach, Dinslaken, Niederrhein, and Rudi Oellig, Duisburg-Meiderich, Germany, assignors to Rutgerswerke Aktiengesellschaft, Frankfurt am Main, Germany
No Drawing. Filed Feb. 10, 1972, Ser. No. 225,303
Claims priority, application Germany, Feb. 12, 1971, P 21 06 788.9
Int. Cl. C08f 45/58; C08g 51/04
U.S. Cl. 260—37 EP
12 Claims

ABSTRACT OF THE DISCLOSURE

A process for the preparation of a flame resistant composition which comprises mixing an epoxy resin and an epoxy resin curing agent with at least one glycidyl ether of a dibrominated mononuclear monophenol, and reacting the resulting mixture at ambient temperature to form the composition, the amount of said ether being sufficient to render said composition flame resistant. The flame resistant compositions are particularly useful as plastics, coatings and adhesives.

---

This invention relates to epoxy-based materials containing a conventional epoxy resin curing agent and a sufficient amount of at least one glycidyl ether of a dibrominated mononuclear monophenol to render the material flame resistant. A process for preparing the materials is provided.

It is well known that epoxy resins, among other things, are useful in the production of engineering parts, as binders in plastics reinforced by glass fibers, in insulating materials for the electric industry and as coating, casting and adhesive materials.

A few of these technical applications require the use of noncombustible raw materials, or at least raw materials which, on the basis of their type or composition, are not capable of supporting any flame.

Nowadays, ways and means are known to change organic combustible substances, especially synthetic resins, so that while they still discharge combustible gases in the heat of flames as a result of their unavoidable decomposition, they are automatically extinquished, after cessation of external exposure to flames.

This flame resistant behavior of plastics is achieved in most cases by the addition of nonreactive phosphorous and/or halogen containing additives, such as for example diphenyl cresyl phosphate, tris-(dibromomethyl)-phosphate, chlorinated aromatic hydrocarbons and others, which are sold commercially under the tradenames "Phosgard," "Advamod," "Firemaster," etc. Also, certain fillers, such as phosphates, carbonates, borates, antimony trioxide or aluminum oxide hydrates, can be worked into the basic raw materials to provide flame resistance.

It also is known to produce polyadducts which are already flame resistant by using halogenated base substances. These halogenated base substances, which are essential for their flame resistance and are chemically bonded in the polymeric substances, change the other special properties of these polymeric substances to a lesser degree than is the case with the nonreactive additives of the previously mentioned types.

In relation to the polyadducts, the epoxy-based flame resistant materials can be built up of polyepoxy resins having halogenated base structures, or conventional curing agents in which halogen-containing groups are present. Heretofore, epoxy compounds derived from tetrachloro or tetrabromo bisphenol were customarily used, as well as curing agents derived from tetrachloro phthalic acid or from hexachloroendo methylenetetrahydrophthalic acid. Besides this, 3,3'-dichloro-4,4'-diaminodiphenylmethane also has become known as a curing agent for self-extinguishing epoxy compounds.

Because of the high viscosity and the decreased reactivity of these epoxy compounds, or of the high melting temperatures and/or the poor solubility of the chlorinated curing agents described, it is necessary to react these substances to form polyadducts in the presence of heat. Processing at elevated temperatures does not of course have a disadvantageous effect on the final characteristics of the polyadducts, but it cannot be carried out by the processor for technical reasons for every purpose of use, since, for one thing, this results in extraordinarily short processing times ("pot life"). Also, the heating of the hardenable combination is practically impossible, for example, when coating large surfaces.

Therefore, in the case of use of the known epoxy compounds and curing agents, it is not possible to formulate a highly fluid mass of resin having a long pot life which can be transformed in thin layers and at ambient temperatures (i.e., between about 15 and 25° C.) into high grade flame resistant polyadducts if, besides flame resistance, high grade thermal, mechanical and electrical properties are required, which properties are also characteristic of the non-flame resistant systems. If, for example, diepoxy compounds derived from tetrabromo bisphenol are used, then hardening at ambient temperature is incomplete. This leads to decreased dimensional stability under heat and/or to decrease of the mechanical strength and electrical properties just as the adjustment of flame resistance by the known nonreactive additives. There have been numerous attempts to overcome the drawbacks described by changing the known epoxy compounds and curing agents; however, up to this time no satisfactory solution to this problem has been known.

Accordingly, this invention provides a process for the preparation of a flame resistant composition which comprises mixing an epoxy resin and an epoxy resin curing agent with at least one glycidyl ether of a dibrominated mononuclear monophenol, and reacting the resulting mixture at ambient temperature to form the composition, the amount of said ether being sufficient to render said composition flame resistant.

This invention also provides a flame resistant plastic, coating or adhesive composition consisting essentially of an epoxy resin, an epoxy resin curing agent, and a sufficient amount of at least one glycidyl ether of a dibrominated mononuclear monophenol to render said composition flame resistant.

By this invention, highly fluid combinations of mono-, di- and polyepoxy compounds can be hardened with all known curing agents for epoxy compounds even at temperatures of 25° C. or below, and flame resistant, thermally, mechanically and electrically high grade polyadducts are obtained.

As used herein, the term "consisting essentially of" means that specified components must be present, but there need not be excluded unspecified components which do not materially detract from the basic and novel characteristics of the composition as disclosed.

According to the present invention, there is used a suitable halogenated reactive thinner for di- and polyglycidyl ethers of di- and polyphenols or aliphatic or cycloaliphatic hydroxy compounds, which must meet the following special requirements:

(1) low viscosity,
(2) low volatility,
(3) sufficient content of substituents having flame resistant effect, (4) sufficient reactivity even with curing agents effective at ambient temperature, and (5) little influence on the mechanical characteristics and dimensional stability of the cured epoxy even when exposed to heat.

Surprisingly, it now has been found that, technically, the most satisfactory solution to the requirements described under 1–5 is the use of glycidyl ethers of dibromated mononuclear monophenols.

The analogous monobromine glycidyl ethers with their relatively low bromine content require too high additions to the polyglycidyl ethers. For example, to the glycidyl ether of 4,4'-dihydroxydiphenylpropane-2,2, approximately 10 to 15% by weight bromine is needed to impart the necessary self-extinguishing characteristics to the products. Furthermore, the monobromine glycidyl ether has a disadvantageous effect on the properties of the hardened plastic, particularly its thermal stability.

The tribromophenyl glycidyl ether derivatives, for example, 2,4,6-tribromophenyl glycidyl ether with 62% bromine content, indeed would be very suitable as far as their portion of halogen is concerned, but they can be used only with difficulty because of their poor solubility if mixed with the polyglycidyl ethers. Phase separation by crystallization occurs when a quantity of the tribromophenyl glycidyl ether derivative corresponding to 5–6% bromine content is added to the polyglycidyl ether.

The advantages of the use of bromine-containing glycidyl ethers according to this invention, on the other hand, are the sufficiently high bromine content, good compatibility with all known di- and polyglycidyl ethers, low viscosity, and thus sufficient and technologically satisfactory reductions of the viscosity of the basic resins, and very good reactivity for use in cold hardening systems.

The flame resistant effect can be further increased by adding about 3–8 percent by weight antimony trioxide or zinc borate to the mixture of the epoxy compound, curing agent and bromine-containing glycidyl ether.

The following are typical dibromophenyl glycidyl ether derivatives which can be used in practicing this invention: dibromophenyl glycidyl ether, 2-methyl-4,6-dibromophenyl glycidyl ether, 4-methyl-2,6-dibromophenyl glycidyl ether, 2-butyl-4,6-dibromophenyl glycidyl ether, 4-isooctyl-2,6-dibromophenyl glycidyl ether, 2-phenyl-4,6-dibromophenyl glycidyl ether, 4-cumyl-2,6-dibromophenyl glycidyl ether. Others will be readily apparent to those skilled in the art.

For mixing with the above characterized dibromophenyl glycidyl ether derivatives, basically all known mono-, di- and polyglycidyl ethers of aliphatic, cycloaliphatic and aromatic polyhydroxyl compounds are suitable. Without limiting the scope of the invention, the following polyglycidyl ethers can be mentioned: 4,4'-diglycidyloxydiphenylpropane-2,2,3,3'-dimethyl-4,4' - diglycidyloxy - diphenylmethane, epoxydized Novolac, 3,5,3',5'-tetrabromodiglycidyloxydiphenylpropane - 2,2,1,2 - diglycidyloxypropane, 1,2,3-triglycidyloxypropane, 1,4 - diglycidyloxybutane, diglycidyloxymethylenetricyclodecane, diglycidyloxydicyclohexylpropane-2,2 and others. For examples of other suitable polyglycidyl ethers see Lee and Neville, "Handbook of Epoxy Resins," McGraw-Hill Book Co., New York (1967).

The mixtures of the dibromophenyl glycidyl ether derivatives and the polyglycidyl ethers can be cured with all known hardening agents for epoxy resins. Besides amines such as aliphatic, cycloaliphatic and aromatic polyamines, above all polycarboxylic acids and acid anhydrides can be used. Furthermore, phenol, urea and melamine formaldehyde resins, Lewis acids and Lewis bases can be used. The amount of each curing agent will of course vary depending upon the type of curing agent and the type of epoxy resin. The amount of any particular curing agent can readily be determined by one skilled in the art. A detailed description of these and other useful curing agents can be found in the "Handbook of Epoxy Resins" previously mentioned.

The dibromophenyl glycidyl ether derivatives are miscible in any desired ratio with all known glycidyl ethers. A sufficient amount of at least one glycidyl ether of a dibrominated mononuclear monophenol is used to render the cured epoxy material flame resistant. This is typically about 3–50% based on the weight of epoxy resin and curing agent, but other amounts which produce the flame resistant effect can be used. Preferably, about 5–35% by weight of at least one dibromophenyl glycidyl ether derivative is used.

The invention now will be explained in more detail on the basis of the following examples and comparative experiments. All parts, proportions and percentages are by weight unless otherwise indicated.

PRODUCTION OF GLYCIDYL ETHER FROM 2,4-/2,6-DIBROMOPHENOL 252 g. of an industrial mixture of 2,6- and 2,4-dibromophenol are reacted with 555 g. epichlorohydrin by heating to about 100° C. Then 88 g. of aqueous 50% sodium lye are allowed to run into the reaction mixture in such a way that a temperature of 118° C. will not be exceeded in the reactor. At the same time the water is distilled azeotropically. The reaction is completed after 4 hours. The excess epichlorohydrin is distilled under vacuum to about 130° C., the reaction product is washed in xylene in order to remove sodium chloride formed during the reaction. After the washing process is completed, the xylene layer is drawn off and the reaction product dissolved in the xylene is filtered at 50° C. After removal of the solvent by distillation there remains a yellowish, low viscosity liquid.

The yield is 282 g.=91.5% of theory. The 2,3-epoxypropyl ether of the dibromophenol has the following properties:

Epoxy resin equivalent _____ 340
Content of hydrolyzable chlorine _____ 0.5
Bromine content in percent _____ 52
Viscosity at 25° C., cp. _____ 150
Density at 20° C. _____ 1.8
Color according to Gardner _____ 2–3
Boiling point as standard pressure, ° C. _____ ~240
Ignition point in an open crucible, ° C. _____ ~210

EXPERIMENTS 1 TO 5

In order to demonstrate the technical advantages of the invention, five comparative experiments were made, the results of which are summarized in Table 1.

First of all, in the upper portion of this table the composition and properties of the epoxy resin-preliminary products used in the experiments are compared with one another. A commercially available bisphenol A diglycidyl ether having an epoxy resin equivalent of 185 is used for comparative purposes as a non-flame resistant base. Two flame resistant combinations according to this invention are made using this same base material, but with the addition of 2,4-/2,6-dibromophenyl glycidyl ether (Experiments 2 and 3). Two other combinations are made using the teachings of the prior art, one with a reactive additive (Experiment 4), and one a non-reactive additive (Experiment 5) to obtain a flame resistant material. The quantities of the various additives are selected in such a way that there results sufficient flame resistance of the polyadducts to be produced from the various epoxy resin-preliminary products. According to experience, this will be the case, for example, with a bromine content of about 10%.

It will be apparent from Table 1 that among the flame resistant epoxy resin-preliminary products only the combinations of Experiments 2, 3 and 5 have a sufficiently low viscosity for processing at ambient temperature. The combination of Experiment 4, on the other hand, is so viscous that its use in a reaction resin mass which can be processed cold is practically impossible.

The epoxy resin-preliminary products of Experiments 1 to 5 are then reacted with triethylenetetramine, a conventional "cold hardener" for epoxy resins, in the mixing ratios stated. The reaction mixtures are poured into molds, and cured according to conditions set forth at the base of Table I. In each experiment, one hardening was carried out at ambient temperature of 20° C. (column a), and one hardening at ambient temperatures and with subsequent tempering at 100° C. (column b).

perience—flame resistance can be further improved by increasing the quantities of the other flame resistant components.

However, this procedure is practical only in the case of use of epoxy resin-preliminary products according to this invention. In the other cases, increasing the amounts of other flame resistant additives results in the deterioration of the mechanical and thermal properties of the molded articles.

TABLE I

| Number of Experiment | 1 | | 2 | | 3 | | 4 | | 5 | |
|---|---|---|---|---|---|---|---|---|---|---|
| Composition of the epoxy resin, preliminary product in parts by weight: | | | | | | | | | | |
| Bisphenol A diglycidylether, industrial | 100 | | 80 | | 70 | | 70 | | 70 | |
| 2,4-/2,6-dibromophenol glycidyl ether, industrially pure | | | 20 | | 30 | | | | | |
| Tetrabromo bisphenol A diglycidyl ether, industrial | | | | | | | 30 | | | |
| Diphenyl cresyl phosphate, industrially pure | | | | | | | | | 30 | |
| Properties of the epoxy resin, preliminary products: | | | | | | | | | | |
| Epoxy resin equivalent (g.) | 185 | | 205 | | 215 | | 220 | | 264 | |
| Density at 20° C. (g./cc.) | 1.17 | | 1.26 | | 1.30 | | 1.29 | | 1.18 | |
| Viscosity at 25° C. (cp.) | 11,000 | | 4,700 | | 3,300 | | 66,000 | | 1,500 | |
| Chlorine content, hydrolyzable (percent) | 0.3 | | 0.35 | | 0.4 | | 0.5 | | 0.2 | |
| Refractive index, $n_D^{25}$ | 1.5720 | | 1.5755 | | 1.5770 | | 1.5839 | | 1.5703 | |
| Bromine content (phosphorous content) (percent) | 0 | | 10.4 | | 15.6 | | 13.5 | | (2.75) | |
| Addition of hardening agent: Parts by weight of hardening agent TETA/100 parts by weight epoxy resin-preliminary product | 13 | | 12 | | 11.5 | | 11 | | 9.5 | |
| Properties of the molded materials | (a) | (b) | (a) | (b) | (a) | (b) | (a) | (b) | (a) | (b) |
| Flexural strength (kg./cm.²) | 1,130 | 1,250 | 1,150 | 1,300 | 1,250 | 1,370 | 116 | 880 | [1] 375 | 970 |
| Deflection at rupture (mm.) | 8 | 10 | 9 | 10 | 10 | 10 | 0.6 | 4.8 | 15 | 10.4 |
| Impact strength (cm.kg./cm.²) | 20 | 22 | 20 | 25 | 22 | 26 | 1 | 10 | 46 | 28 |
| Dimensional stability under heat (° C.) | 60 | 93 | 60 | 90 | 58 | 88 | 38 | 95 | <30 | 34 |
| Ball indentation hardness: | | | | | | | | | | |
| H_c 10 (kg./mm.²) | 16 | 15.2 | 15.5 | 15.8 | 14.8 | 15.0 | 14.1 | 14.2 | 8.7 | 12.8 |
| H_c 60 (kg./mm.²) | 15.8 | 14.7 | 15.0 | 14.8 | 14.5 | 14.8 | 13.6 | 13.7 | 7.2 | 11.9 |
| Bromine content (phosphorous content) of the molded articles (percent) | 0 | | 9.0 | | 13.5 | | 12.4 | | (2.5) | |
| Combustibility of the molded articles [2] | | | | | | | | | | |
| According to VDE 0304-3, step | IIIa | | IIc | | IIb | | IIc | | IIc | |
| Flame propagation (mm.) | | | 49.4 | | 24.0 | | 34.0 | | 37.0 | |
| Speed of flame propagation (mm./sec.) | 0.33 | | | | | | | | | |
| According to ASTM D 635 | ([3]) | | ([4]) | | ([4]) | | ([4]) | | ([4]) | |
| Burnt length (mm.) | | | 13.5 | | 6.0 | | 8.0 | | 9.0 | |
| Burning rate (mm./min.) | 85 | | | | | | | | | |

[1] Flexural strength at a given deflection.
[2] The combustibility of the articles molded according to (a) or (b) is about the same, thus it is practically independent of the hardening method. The evaluations are based on the molded articles hardened according to (b).
[3] Combustible.
[4] Self-extinguishing.

NOTE:—Curing conditions.—(a) 48 hours at 20° C.; (b) 48 hours at 20° C. plus 3 hours at 100° C.

The molded articles and test bodies produced in this way were tested according to the pertinent standards for their mechanical properties, their dimensional stability under heat according to Martens, DIN 53, 453, as well as for their combustibility according to VDE 0304-3 and ASTM D 635.

A comparison of the results obtained with the non-flame resistant material of Experiment 1, which is to be considered as standard, with the results using the epoxy resin-preliminary products of the invention (Experiments 2 and 3), as well as with the results of Experiments 4 and 5 which characterize the status of the prior art, shows the unequivocal superiority of the epoxy resin molded articles produced according to the present invention.

The superior properties are particularly apparent from a comparison of the values of the articles cured by an ambient temperature hardening step only (column a). The advantages of the present invention are particularly evident by comparing the values of flexural strength, deflection, impact strengths and dimensional stability under heat for each experiment.

While the molded articles of Experiments 1, 2 and 3 have some properties comparable, the molded articles of Experiments 4 and 5 definitely differ. Moreover, they turned out to be incompletely hardened, which is evident by their very low dimensional stability under heat, and by the distinct "secondary hardening" phenomena occurring during tempering (see e.g., values in column b).

The flame resistance of the molded articles of Experiments 2 to 5 are approximately comparable and correspond to expectations. Molded articles prepared according to this invention show some additional advantages. It is related to the content of bromine or phosphates in the molded article, and therefore—as known from ex- Another advantage of the epoxy resin-preliminary products according to this invention lies in the fact that, while having a low viscosity, they also have a low volatility. This characteristic makes possible their processing under a vacuum. Therefore, mixtures containing polycarboxylic acid anhydrides can be processed at elevated temperature and under simultaneous vacuum.

Mixtures of epoxy resin-preliminary products according to this invention which contain liquid or low melting dicarboxylic acid anhydrides moreover have a low processing viscosity even at ambient temperature. Heretofore, such low viscosities for flame resistant systems containing mixtures of bisphenol A resins and tetrabromo-bisphenol A diglycidyl ether could only be obtained at temperatures of 40° C. or above.

EXPERIMENT 6

A mixture of 70% by weight of bisphenol A diglycidyl ether (epoxy resin equivalent: 185), 30 parts by weight 2,4-/2,6-dibromophenyl glycidyl ether, 65 parts by weight hexahydrophthalic acid anhydride and 1.5% by weight benzyldimethylamine is prepared and poured into a suitable mold for the production of standard bars (120 x 15 x 10 mm.). The mixture is cured for 3 hours at 80° C. Subsequently the mixture is retempered at 130° C. for 10 hours. The hardened standard bars have the following properties:

Flexural strength _____ kg./cm.² __ 1320
Deflection _____ mm __ 10
Impact strength _____ cm. kg./cm.² __ 23
Dimensional stability under heat according to
  DIN 53, 453 _____ ° C __ 110
Flame resistance according to
  ASTM D 635 _____ Nonflammable

EXPERIMENT 7

A mixture of 70 parts by weight diglycidyloxymethyl-enetricyclodecane, 30 parts by weight 2,4-/2,6-dibromophenyl glycidyl ether, 70 parts by weight methylenedomethylenetetrahydrophthalic acid anhydride and 1.5 parts by weight benzyldimethylamine is cured as described in Experiment 6 for 3 hours at 80° C., and subsequently for 10 hours at 150° C.

The slightly yellowish test bodies have the following properties:

| | |
|---|---|
| Flexural strength kg./cm.$^2$ | 1150 |
| Deflection mm | 13 |
| Impact strength cm. kg./cm.$^2$ | 21 |
| Dimensional stability under heat according to DIN 53, 453 ° C | 87 |
| Flame resistance according to ASTM D 635 | Nonflammable |

It will be apparent from the foregoing examples that, as used herein, the term "flame resistant composition" is intended to mean a composition of matter which is nonflammable or at least self-extinguishing, when tested according to ASTM D 635.

What is claimed is:

1. A process for the preparation of a flame resistant composition which comprises mixing an epoxy resin and an epoxy resin curing agent with at least one glycidyl ether of a dibrominated mononuclear monophenol, and reacting the resulting mixture at ambient temperature to form the composition, the amount of said ether being sufficient to render said composition flame resistant.

2. Process of claim 1 in which the amount of said ether is about 3–50 percent by weight.

3. Process of claim 1 in which the amount of said ether is about 5–35 percent by weight.

4. Process of claim 3 in which the ether is: dibromophenyl glycidyl ether, 2-methyl-4,6-dibromophenyl glycidyl ether, 4-methyl-2,6-dibromophenyl glycidyl ether, 2-butyl-4,6-dibromophenyl glycidyl ether, 4-isooctyl-2,6-dibromophenyl glycidyl ether, 2 - phenyl-4,6-dibromophenyl glycidyl ether, 4-cumyl-2,6-dibromophenyl glycidyl ether.

5. Process of claim 4 in which the curing agent is an amine, a polycarboxylic acid or acid anhydride, a phenol, an urea and melamine formaldehyde resin, a Lewis acid or a Lewis base.

6. A flame resistant composition consisting essentially of the reaction product of an epoxy resin, an epoxy resin curing agent, and a sufficient amount of at least one glycidyl ether of a dibrominated mononuclear monophenol to render said composition flame resistant.

7. Flame resistant composition of claim 6 in which the amount of the ether is about 3–50 percent by weight.

8. Flame resistant composition of claim 6 in which the amount of the ether is about 5–35 percent by weight.

9. Flame-resistant composition of claim 8 in which the ether is: dibromophenyl glycidyl ether, 2-methyl-4,6-dibromophenyl glycidyl ether, 4 - methyl-2,6-dibromophenyl-4,6-dibromophenyl glycidyl ether, 4 - cumyl - 2,6-ether, 4 - isooctyl-2,6-dibromophenyl glycidyl ether, 2-phenyl-3,6-dibromophenyl glycidyl ether, 4 - cumyl-2,6-dibromophenyl glycidyl ether.

10. Flame resistant composition of claim 9 in which the epoxy resin curing agent is an amine, a polycarboxylic acid or acid anhydride, a phenol, an urea and melamine formaldehyde resin, a Lewis acid or a Lewis base.

11. Flame resistant composition of claim 10 reinforced with glass fibers.

12. Flame resistant composition of claim 11 containing about 3–8 percent by weight antimony trioxide or zinc borate.

References Cited

UNITED STATES PATENTS

| | | | |
|---|---|---|---|
| 2,221,771 | 11/1940 | Alquist et al. | 260—348 R |
| 3,252,850 | 5/1966 | Partansky | 260—47 EC X |
| 3,329,652 | 7/1967 | Christie | 260—30.4 EP X |
| 3,367,911 | 2/1968 | Daum et al. | 260—30.4 EP X |

LEWIS T. JACOBS, Primary Examiner

U.S. Cl. X.R.

260—30.4 EP, 45.8 A